Aug. 28, 1934.   A. E. KOON   1,971,349
COTTON HARVESTING MACHINE
Filed Nov. 20, 1933    3 Sheets-Sheet 1
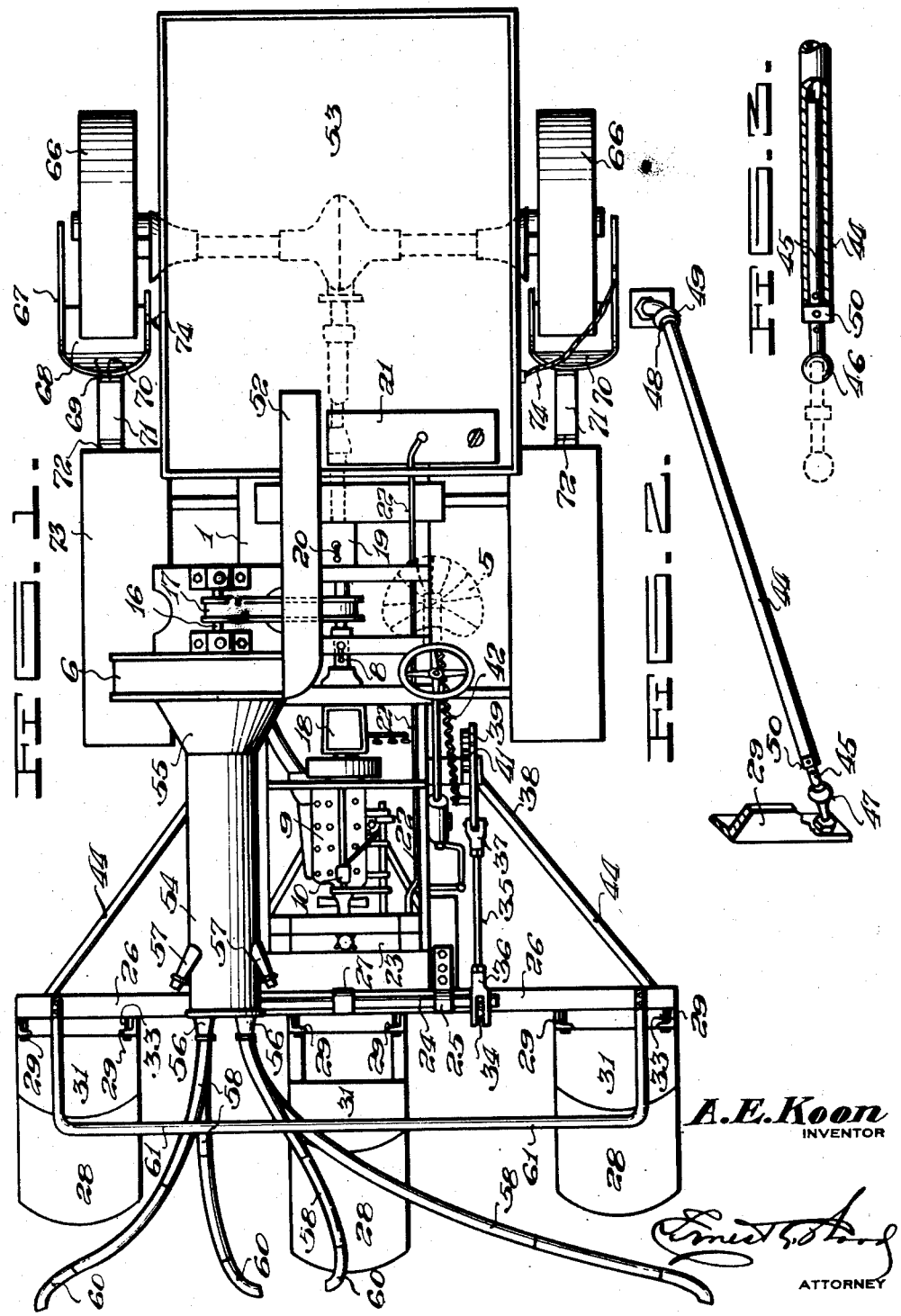

Aug. 28, 1934.    A. E. KOON    1,971,349
COTTON HARVESTING MACHINE
Filed Nov. 20, 1933    3 Sheets-Sheet 2
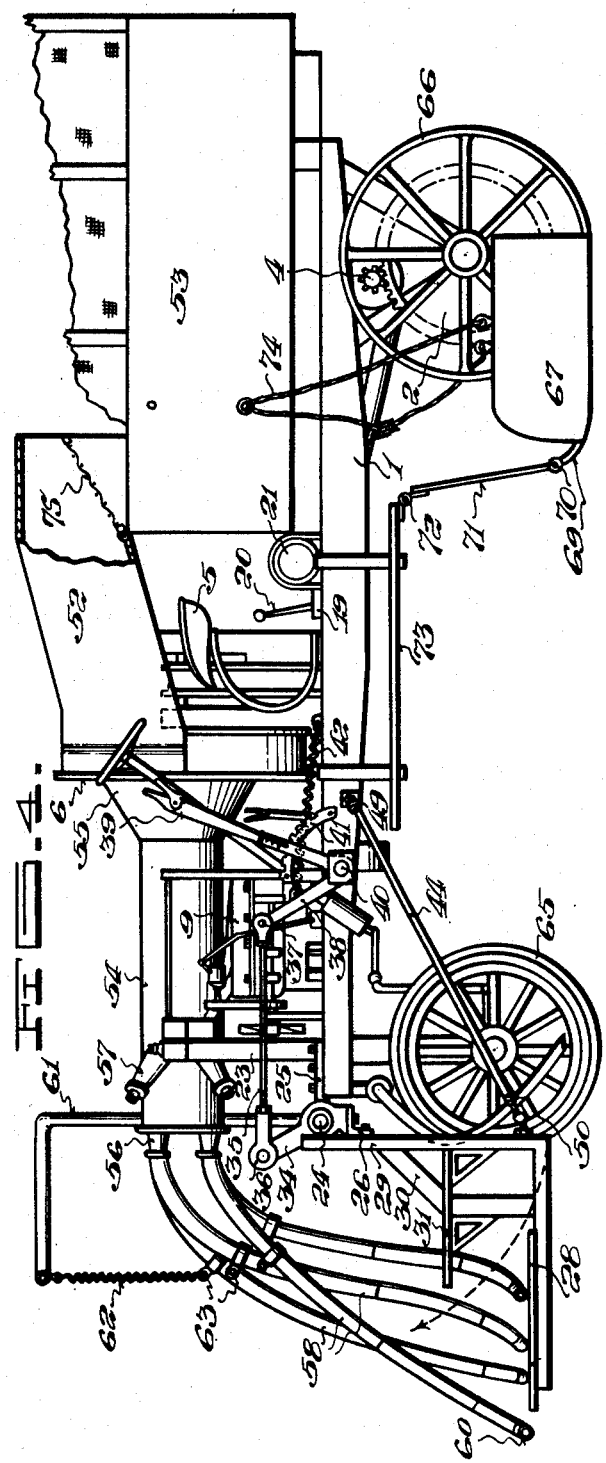
A. E. Koon
INVENTOR
ATTORNEY Aug. 28, 1934.     A. E. KOON     1,971,349
COTTON HARVESTING MACHINE
Filed Nov. 20, 1933     3 Sheets-Sheet 3
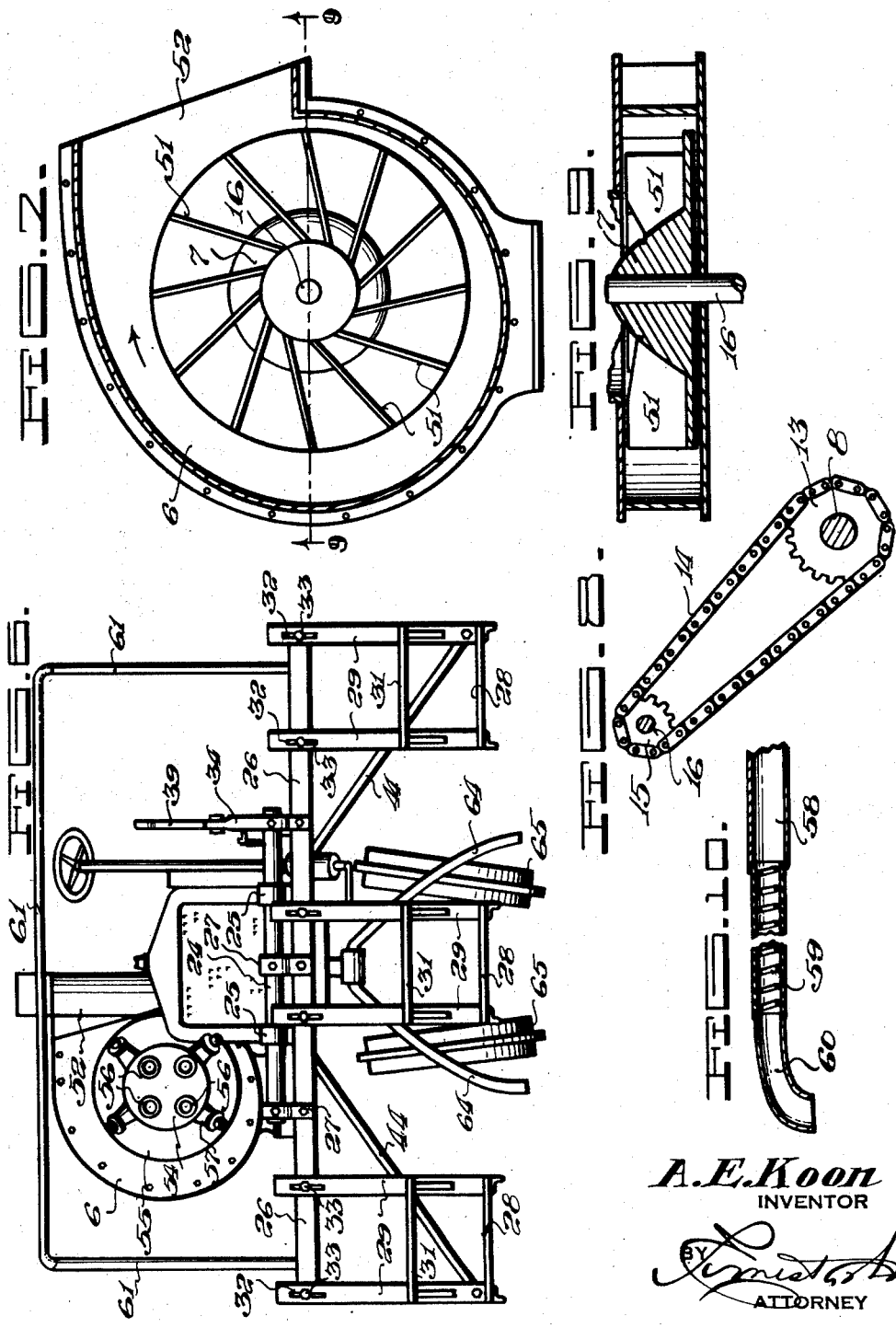
A. E. Koon
INVENTOR
ATTORNEY Patented Aug. 28, 1934

1,971,349

UNITED STATES PATENT OFFICE 1,971,349

COTTON HARVESTING MACHINE

Austin E. Koon, Gainsville, Tex.

Application November 20, 1933, Serial No. 698,737

6 Claims. (Cl. 56—12)

This invention relates to cotton harvesting machinery and it has particular reference to a cotton harvesting or gathering machine employing a suction to effect removal of the cotton from the stalk.

The principal object of the invention is to provide a motor propelled machine or an attachment for motor propelled conveyances to embody the invention, whereon is provided means on which one or more persons may be seated while picking the cotton as the machine traverses the row.

Another object of the invention is to provide a suction unit having a manifold head, to the several ports of which is connected a flexible hose for the use of each of the operators seated at the front of the machine. A receptacle is provided to the rear of the driver of the machine into which the suction unit discharges.

Another object of the invention is to provide means to displace the operator's seat or platform at the front of the machine, that is to say, to elevate the platform to a position above the tops of the stalks when it is required to turn the machine around such as at the ends of the rows in order to prevent the platform from knocking the cotton from the stalk onto the ground.

Still another object of the invention is to provide for vertical adjustment of the operators' seats with respect to the ground.

Broadly, the invention comprehends the provision of a cotton gathering or harvesting machine with provisions for subjecting the cotton to a relatively high degree of vacuum from its point of reception to the point of discharge, through which period, the cotton is required to travel a considerable distance. Subjection of the cotton to the vacuum during its travel through the machine is effective in fluffing or loosening the locks, making for greater ease in ginning and at the same time producing a more desirable sample, due to the fact that in loosening the locks, the lint may be more readily removed from the seed and without breaking the fibers as would be the case if the cotton were introduced into the gin in a compact mass.

With the foregoing objects as paramount, the invention has particular reference to its salient features of construction and arrangement of parts, which will become manifest as the description proceeds, taken in connection with the accompanying drawings, wherein:—

Figure 1 is a plan view of a machine embodying the elements of the present invention.

Figure 2 is a detail view of one of the telescoping brace rods for suspending the lower portion of the seats or platforms adjacent the front of the machine.

Figure 3 is a fragmentary detail view, partly in section of the rod shown in Figure 2.

Figure 4 is a side elevation of the invention.

Figure 5 is a detail view of the mechanism for raising and lowering the platforms.

Figure 6 is a front elevation of the invention.

Figure 7 is a vertical section through the fan housing.

Figure 8 is a detail view of the chain drive.

Figure 9 is a sectional view of the fan impeller.

Figure 10 is a fragmentary view partly in section, showing one of the flexible tubes, and Figure 11 is an axial section through the fan drive clutch.

Continuing more in detail with the drawings, 1 designates the frame of the motor conveyance, which in the present case is an automobile converted into a truck and suitably geared to reduce its speed to a practical degree for the use to which it is applied. In effecting the required speed reduction, a large gear 2 is provided on the rear axle 3 and a small pinion 4 is disposed upon the driving axle of the vehicle to enmesh the gear 2. This transmission provides a range of speed from one mile per hour to ten miles per hour.

Situated to the right of the driver's seat 5 is a suction fan, the housing of which is designated at 6. It is desirable for all practical purposes that the speed of the impeller 7 within the fan be maintained at a constant rate irrespective of the speed of the machine along the rows. Accordingly, the shaft 8 of the motor 9, operating at high speed under control of the governor 10 (see Figures 1 and 4) imparts rotation to a sliding clutch element 11, the latter being keyed to the shaft 8 in the manner shown in Figure 11. The companion clutch element 12 is made integral with or secured to the gear 13 and is mounted freely on the shaft 8. Reference to Figure 8 will disclose a chain 14, surrounding the gear 13 and a smaller gear 15, situated upon the fan shaft 16. The gears 13 and 15 as well as the chain 14 are concealed by the hood 17 in Figure 1. Further reference to the specific construction of the fan will be made later.

In addition to the conventional transmission 18 of the motor 9, further reference to Figure 1 will disclose a transmission 19 from which extends a gear shifting lever 20 which is accessible to the operator of the machine. Otherwise, the driving mechanism is conventional aside from the variations previously described as relating to the specific drive between the gear 2 and cooperating pinion 4. It may be mentioned however, that due to the high rate of speed at which the motor 9 is required to operate, an auxiliary cooling system is installed which consists of a reservoir 21 (see Figure 1) and a pipe 22 which enters the bottom of the radiator 23 of the engine ahead of the conventional circulating pump. Thus the water is given ample time to cool and accordingly maintains the engine at a much lower temperature than if the conventional cooling system were relied upon.

Forwardly of the radiator 23 is a shaft 24 and is supported by brackets 25 secured to the frame 1. A bar 26 is suspended from the shaft 24 by means of clamps 27. Suspended in turn from the bar or beam 26 is a series of seats or platforms 28. The suspending means for the platforms 28 consists of the parallel members 29, to which the platforms 28 are suitably braced by means of the angular reinforcing members 30, shown only in Figure 4. Seats 31 are provided immediately above the platforms 28.

It will be observed that the members 29 which support the platforms 28 are adjustable vertically with respect to the ground by reason of the slots 32 in their upper ends which accommodate bolts 33, mounted in the cross bar 26.

To avoid injury to the stalks as the machine is turned around at the ends of the rows, it is desirable that the platforms 28 be elevated to a point above the tops of the stalks. To accomplish this, an arm 34 is secured to the shaft 24 and extends upwardly therefrom and to the upper end of this arm, a rod 35 is pivoted, through the medium of the clevis 36. See Figure 5. The opposite end of the rod 35 is pivotally joined at 37 to an angular extension 38 of a hand lever 39. The lever 39 is pivoted at 40 and operates over a quadrant 41. It is obvious that by moving the lever 39, the frame structure of the seats and platforms will be elevated as a unit as described by the arrows in Figure 4, the shaft 24 serving as a fulcrum. In order that the operator will not be burdened with the full weight of the structure in the operation of raising and lowering the same, a spring 42 is provided, one end of which is secured at 43 to the angular extension 38 of the lever, while its opposite end is secured at some point on the frame of the vehicle as shown in Figures 4 and 5.

Brace rods 44 are provided to rigidify the lower extremities of the platform suspending members 29 so that the platforms will support the weight of an operator. Due to the fact that the platforms are required to be raised and lowered, the members 44 must be extensible as well as being capable of axial displacement. Thus, the members are comprised of the tubular portions, identified by the numeral 44 into which extends the rods 45. Detail views of this combination are shown in Figures 2 and 3. The rod 45 has a ball 46 on one end which operates in a socket 47 secured to the lower portion of one of the depending members 29. A similar ball 48 is carried upon the end of the tubular member 44 and is retained in a socket 49 which, as apparent in Figure 4 is secured to the frame 1 of the vehicle. A collar 50 is adjustably secured adjacent the lower end of the rod 45 and affords an abutment for the tubular member 44 to sustain the platform supporting members 29 in a perpendicular position when they are lowered.

With further reference to the fan, it will be observed that the blades 51 are so arranged that they do not converge at a common point adjacent the axis of the drive shaft 16 but are tangent to the cone shaped hub, identified by the character 7 employed previously to identify the fan proper. It will also be noted in Figure 9 that the blades are cut away at a point approximately midway between their inner and outer ends at an angle with respect to their longitudinal axes. This is done in order that a partial vacuum will be produced around the drive shaft in order that the incoming fiber will be blown clear and discharged freely through the discharge pipe 52 into a screen covered receptacle 53. The impeller is not concentric with the fan housing 6 as apparent in Figure 7, which fact promotes freer discharge and is effective in preventing clogging. It is of further importance to note that the clearances between the impeller and the fan housing are such that leaves and other foreign matter which might possibly be drawn in with the cotton will have free discharge and there is little likelihood that leaves and the like will be crushed between the moving and stationary parts to discolor and otherwise impair the cotton. The clearance of the blades with respect to the lower edge of the discharge pipe 52, see Figure 7, is not such as to permit backlash of air currents which may cause clogging at this point.

An intake conduit 54 is situated at one side of the motor 9 and has a funnel shaped portion 55 which is in communication with the fan housing 6. The opposite end of the conduit 54 is closed except for the nipples 56. Similar nipples 57 are disposed circumferentially about the conduit and are disposed at an angle with respect to its longitudinal axis. To each of the nipples 56 and 57 is connected a highly flexible hose or tube 58. A fragmentary view of one of the tubes is shown in Figure 10 and it is pointed out in this figure that while the tube is flexible from one end to the other, the degree of flexibility adjacent its free end is required to be greater than the remainder of the tube. The highly flexible extremities of the tubes are preferably comprised of rubber covered, spirally wound wire 59 so that the operator may move the free ends of the tubes about with greater ease and effectiveness than would be the case were the entire tube constructed of metal wrapped hose of which the greater portion of the tube is comprised for the sake of durability. A nozzle 60 is provided on the extreme end of each of the tubes 58 and may be of any practical construction.

Should it be desired to dispense with one or more of the tubes 58, the nipples from which the tubes are removed are required to be capped in some suitable manner in order that the vacuum will not be destroyed.

It is desired that the greater portion of the weight of the tubes 58 be suspended so as to relieve the operators of the burden of having to lift the weight of the entire tube to manipulate the nozzles. This is accomplished through the medium of a frame 61 mounted upon the cross bar 26 at the front of the machine and whose upper portion is so shaped as to overreach the platforms 28. A series of springs 62, shown in Figure 4 or other means of suitable elasticity are secured to the overhanging portion of the frame 61 and to these springs or the like are suspended collars 63, each embracing a tube 58. It will therefore be seen that the operator is required only to manipulate the lower extremities of the tubes 58 and upon releasing them, they return to an inoperative position well above the stalks of cotton.

As a precaution against damage to the cotton as the machine traverses the row, members 64 are secured at the front of the machine and extend outwardly and downwardly about the front wheels 65 of the machine. These members 64 prevent stalks of cotton from coming into contact with the wheels and prevent the likelihood that the cotton will be thus dislodged from the burr. An arrangement for a similar purpose is provided for the rear wheels 66 of the machine and is comprised of aprons 67, one of which is disposed on either side of each wheel, each pair of aprons being connected together by a strip of wood 68. A metallic runner or sole 69 is secured to the underside of each of the strips of wood and is curved upwardly at its forward end, terminating in a hinge 70. A metal strip 71 is joined to the hinge 70 and extends upwardly and is connected through the medium of a similar hinge 72 to the running board 73 of the vehicle. This arrangement slides along the ground immediately in front of each of the wheels 66 and through the medium of suitable cables 74, the guards thus provided may be raised and lowered by the driver of the vehicle from his position on the seat 5.

It will be observed in Figure 4 that an inclined and adjustable screen 75 is provided in the outlet end of the discharge pipe 52 so that cotton will impinge the same with considerable force in its passage to the receptacle 53. In so doing, much of the dirt and pin trash will be separated from the cotton and will fall through the screen.

Manifestly, the construction shown is capable of considerable modification and such modification as is considered within the scope and meaning of the appended claims is also considered within the spirit and intent of the invention.

What is claimed is:

1. A cotton harvester in combination with a motor driven vehicle, a series of alined platforms suspended from the frame of said vehicle for pivotal displacement relative to the frame of said vehicle, a suction fan supported on said vehicle and having an intake manifold, a series of flexible tubes connected to said intake manifold, each being yieldingly supported above said platforms and means to receive the discharge from said suction fan.

2. A cotton harvester in combination with a motor driven vehicle, a series of alined platforms suspended for pivotal movement at the front of said vehicle, means to effect movement of said platforms simultaneously from a point adjacent the driver's seat of said vehicle, a suction fan mounted on said vehicle, a series of flexible tubes suspended above said platforms, each having communication with the intake manifold of said suction fan and means to receive the discharge of said suction fan.

3. A cotton harvester including in combination with a motor driven vehicle, a series of platforms in alined relationship and supported for pivotal displacement with respect to the frame of said vehicle, means mounted on said vehicle and operated from the driver's seat thereof to raise and lower said platforms simultaneously, a suction fan mounted on said vehicle, a series of flexible suction tubes suspended for manipulation from a point on said platforms, each being connected to the intake port of said suction fan and means also carried by said vehicle to receive the discharge from said fan.

4. In a cotton harvesting machine, a suction fan, a multiplicity of flexible suction tubes in communication with its intake port, means for driving said fan at a constant rate of speed, a series of pivotally suspended platforms, means for suspending said suction tubes for yielding movement above said platforms and means to receive material entering said tubes through the action of said fan.

5. In a cotton harvesting machine, a series of platforms suspended for pivotal movement on a common support, means to effect independent vertical adjustment of said platforms, a suction fan, a series of flexible tubes having communication with the intake port of said fan and suspended for yielding movement above said platforms, a receptacle for receiving cotton dislodged and transported by said tubes by the action of said fan and means for driving said fan at a constant rate of speed.

6. A cotton harvesting machine in combination with a motor operated vehicle, a series of platforms suspended for pivotal movement at the front of said vehicle, a suction fan mounted on said vehicle, transmission means operated by the motor of said vehicle for driving said fan at a constant rate of speed irrespective of the speed of said vehicle, a plurality of flexible tubes yieldingly suspended above said platforms for manipulation from a point on said platforms and having communication with the intake port of said fan and means to receive and retain cotton dislodged by said tubes and transported by the action of said fan.

AUSTIN E. KOON.